(12) United States Patent
Radhakrishnan et al.

(10) Patent No.: US 12,471,800 B2
(45) Date of Patent: Nov. 18, 2025

(54) SYSTEMS AND METHODS FOR ENDOBRONCHIAL DIAGNOSTICS

(71) Applicant: Pulmonx Corporation, Redwood City, CA (US)

(72) Inventors: Sri Radhakrishnan, Cupertino, CA (US); Ryan Olivera, Granite Bay, CA (US)

(73) Assignee: Pulmonx Corporation, Redwood City, CA (US)

( * ) Notice: Subject to any disclaimer, the term of this patent is extended or adjusted under 35 U.S.C. 154(b) by 657 days.

(21) Appl. No.: 17/363,613

(22) Filed: Jun. 30, 2021

(65) Prior Publication Data

US 2022/0007962 A1  Jan. 13, 2022

Related U.S. Application Data

(60) Provisional application No. 63/050,312, filed on Jul. 10, 2020.

(51) Int. Cl.
*A61B 5/08* (2006.01)
*A61B 5/00* (2006.01)
(Continued)

(52) U.S. Cl.
CPC ................ *A61B 5/082* (2013.01); *A61B 5/01* (2013.01); *A61B 5/085* (2013.01); *A61B 5/087* (2013.01); *A61M 16/208* (2013.01)

(58) Field of Classification Search
CPC ....... A61B 5/6853; A61B 5/091; A61B 5/093; A61B 5/085; A61M 16/0434
See application file for complete search history.

(56) References Cited

U.S. PATENT DOCUMENTS

| 7,798,147 B2 | 9/2010 | Hendricksen et al. |
| 7,883,471 B2 | 2/2011 | Aljuri et al. |

(Continued)

FOREIGN PATENT DOCUMENTS

| JP | 2008528105 A | 7/2008 |
| JP | 2011523363 A | 8/2011 |

(Continued)

OTHER PUBLICATIONS

PCT/US2021/039991 International Search Report and Written Opinion of the Searching Authority dated Oct. 19, 2021.

*Primary Examiner* — Puya Agahi
(74) *Attorney, Agent, or Firm* — Kilpatrick Townsend & Stockton LLP

(57) ABSTRACT

Methods and systems for accessing and diagnosing diseased lung compartments are disclosed. Methods may comprise introducing a diagnostic catheter with an occluding member at its distal end into a lung segment; inflating the occluding member to isolate the lung compartment; and performing a diagnostic procedure with the catheter. The proximal end of the diagnostic catheter is configured to be attached to a console. Methods may also include allowing air to enter the lung compartment through the passage in the catheter while the patient is inhaling and blocking air from being expelled from the lung compartment through the catheter passage while the patient is exhaling by using a one-way flow element adapted to be disposed within or in-line with the passage of the catheter so that flow in a proximal-to-distal direction is allowed and flow in a distal-to-proximal direction is inhibited or prevented.

17 Claims, 11 Drawing Sheets

(51) Int. Cl.
    *A61B 5/01*     (2006.01)
    *A61B 5/085*     (2006.01)
    *A61B 5/087*     (2006.01)
    *A61M 16/20*     (2006.01)

(56) References Cited

U.S. PATENT DOCUMENTS

| | | |
|---|---|---|
| 8,136,526 B2 | 3/2012 | Perkins et al. |
| 10,758,239 B2 | 9/2020 | Aljuri et al. |
| 2003/0051733 A1 | 3/2003 | Kotmel et al. |
| 2007/0142742 A1 | 6/2007 | Aljuri et al. |
| 2008/0027343 A1 | 1/2008 | Fields et al. |
| 2011/0201956 A1 | 8/2011 | Alferness et al. |
| 2011/0270116 A1* | 11/2011 | Freitag ............... A61B 5/6852 600/538 |
| 2012/0149995 A1 | 6/2012 | Mantri et al. |
| 2012/0150057 A1* | 6/2012 | Mantri ............... A61B 5/087 600/529 |
| 2014/0142455 A1* | 5/2014 | Freitag ............... A61B 5/0813 600/538 |
| 2014/0336484 A1 | 11/2014 | Mantri et al. |
| 2018/0353116 A1 | 12/2018 | Mantri et al. |
| 2020/0329996 A1* | 10/2020 | Radhakrishnan ...... A61B 5/085 |
| 2020/0360633 A1* | 11/2020 | Taylor ............... A61M 16/0434 |

FOREIGN PATENT DOCUMENTS

| | | |
|---|---|---|
| JP | 2020086701 A | 6/2020 |
| WO | WO-2006078451 A2 | 7/2006 |
| WO | WO-2009135070 A1 | 11/2009 |

\* cited by examiner

SYSTEMS AND METHODS FOR ENDOBRONCHIAL DIAGNOSTICS

CROSS-REFERENCE TO RELATED APPLICATIONS

This application claims the benefit of U.S. Provisional No. 63/050,312, filed Jul. 10, 2020, the entire content of which is incorporated herein by reference.

BACKGROUND OF THE INVENTION

1. Field of the Invention

This invention relates generally to methods for diagnosis and treatment of lung disease.

Chronic obstructive pulmonary disease (COPD), including emphysema and chronic bronchitis, is a significant medical problem currently affecting around 16 million people in the U.S. alone (about 6% of the U.S. population). In general, two types of diagnostic tests are performed on a patient to determine the extent and severity of COPD: 1) imaging tests; and 2) functional tests. Imaging tests, such as chest x-rays, computerized tomography (CT) scans, Magnetic Resonance Imaging (MM) images, perfusion scans, and bronchograms, provide a good indicator of the location, homogeneity and progression of the diseased tissue. However, imaging tests do not provide a direct indication of how the disease is affecting the patient's overall lung function and respiration. Lung function can be better assessed using functional testing, such as spirometry, plethysmography, oxygen saturation, and oxygen consumption stress testing, among others. Together, these imaging and functional diagnostic tests are used to determine the course of treatment for the patient.

One of the emerging treatments for COPD involves the endoscopic introduction of endobronchial occluders or one-way valve devices ("endobronchial valves" or "EBVs") into pulmonary passageways to reduce the volume of one or more hyperinflated lung compartments, thus allowing healthier compartments more room to breathe and perhaps reducing pressure on the heart. Examples of such a method and implant are described, for example, in U.S. patent application Ser. No. 11/682,986 and U.S. Pat. No. 7,798,147, the full disclosures of which are hereby incorporated by reference. One-way valves implanted in airways leading to a lung compartment restrict air flow in the inhalation direction and allow air to flow out of the lung compartment upon exhalation, thus causing the adjoining lung compartment to collapse over time. Occluders block both inhalation and exhalation, also causing lung collapse over time.

It has been suggested that the use of endobronchial implants for lung volume reduction might be most effective when applied to lung compartments which are not affected by collateral ventilation. Collateral ventilation occurs when air passes from one lung compartment to another through a collateral channel rather than the primary airway channels. If collateral airflow channels are present in a lung compartment, implanting a one-way valve or occluder might not be as effective, because the compartment might continue to fill with air from the collateral source and thus fail to collapse as intended. In many cases, COPD manifests itself in the formation of a large number of collateral channels caused by rupture of alveoli due to hyperinflation, or by destruction and weakening of alveolar tissue.

An endobronchial catheter-based diagnostic system typically used for collateral ventilation measurement is disclosed in U.S. Patent Publication No. 2003/0051733 (hereby incorporated by reference), wherein the catheter uses an occlusion member to isolate a lung compartment and the instrumentation is used to gather data such as changes in pressure and volume of inhaled/exhaled air. Methods for collateral ventilation measurement are disclosed in U.S. Pat. No. 7,883,471 and U.S. Patent Publication Nos. 2008/0027343, 2014/0336484, and 2007/0142742 (all of which are hereby incorporated by reference), in which an isolation catheter is used to isolate a target lung compartment and pressure changes therein are sensed to detect the extent of collateral ventilation. The applications also disclose measurement of gas concentrations to determine the efficiency of gas exchange within the lung compartment. Similar methods are disclosed in PCT Application No. WO2009135070A1 (hereby incorporated by reference), wherein gas concentration changes in a catheter-isolated lung portion allow collateral ventilation to be determined.

Quantifying collateral ventilation via collateral resistance measurement and calculations typically takes about two to five minutes. During this time, the physician must ensure the patient is tolerating sedation, manage secretions to prevent occlusion within the catheter lumen, and maintain balloon seal/position within the target airway. Any one of these factors may extend the assessment time and compromise the assessment results. Thus, there is a need to quantify the magnitude of collateral ventilation within a lung compartment (lobe, segment, sub-segment, or the like) more quickly and efficiently.

Therefore, it would be advantageous to have new diagnostic techniques for evaluating the state of lung disease progression, such as determining the presence and degree of collateral ventilation. At least some of these objectives will be met by the embodiments described herein.

BRIEF SUMMARY OF THE INVENTION

This application discloses methods and systems for assessing the functionality of a lung compartment in a patient. In one aspect, a method of assessing the functionality of a lung compartment in a patient comprises introducing a diagnostic catheter into the lung compartment, inflating the occluding member to isolate the lung compartment, measuring $CO_2$ concentration within the isolated lung compartment over time, and determining whether collateral ventilation is present in the isolated lung compartment based on the measured $CO_2$ concentration within the isolated lung compartment over time. The proximal end of the diagnostic catheter is configured to be attached to a console, and data from the diagnostic procedure may be displayed on the console. In an embodiment, collateral ventilation can be determined to be present in the isolated lung compartment if the $CO_2$ concentration within the isolated lung compartment fluctuates with breathing. Collateral ventilation may be determined not to be present in the isolated lung compartment if the $CO_2$ concentration within the isolated lung compartment plateaus over time. In an embodiment, a degree of collateral ventilation may be determined based on the slopes of different regions of $CO_2$ concentration curves.

In another aspect, a method of assessing the functionality of a lung compartment in a patient comprises introducing a diagnostic catheter into the lung compartment, inflating the occluding member to isolate the lung compartment, measuring $O_2$ concentration within the isolated lung compartment over time, and determining whether collateral ventilation is present in the isolated lung compartment based on the measured $O_2$ concentration within the isolated lung compartment over time. The proximal end of the diagnostic catheter is configured to be attached to a console, and data from the diagnostic procedure may be displayed on the console. In an embodiment, collateral ventilation can be determined to be present in the isolated lung compartment if the $O_2$ concentration within the isolated lung compartment plateaus above a threshold value. Collateral ventilation may be determined not to be present in the isolated lung compartment if the $O_2$ concentration within the isolated lung compartment decreases below a threshold value. In an embodiment, a degree of collateral ventilation may be determined based on the degree of reduction of the $O_2$ concentration within the isolated lung compartment after isolation. Optionally, the methods may be performed while the patient is ventilated via an assisted ventilation device with air having an elevated $O_2$ concentration.

In yet another aspect, a method of assessing the functionality of a lung compartment in a patient comprises sealing a distal end of a catheter in an airway feeding the lung compartment by using an occluding member that is adapted to be expanded in an airway which feeds the lung compartment such that access to the lung compartment is provided only through a passage of the catheter when the occluding member is expanded, allowing air to enter the lung compartment through the passage in the catheter while the patient is inhaling, blocking air from being expelled from the lung compartment through the catheter passage while the patient is exhaling by using a one-way flow element adapted to be disposed within or in-line with the passage of the catheter so that flow in a proximal-to-distal direction is allowed and flow in a distal-to-proximal direction is inhibited or prevented, measuring flow into the lung compartment, and determining whether collateral ventilation is present in the lung compartment based on the measured measuring flow into the lung compartment. In an embodiment, it can be determined that no collateral ventilation is present if flow into the lung compartment decreases below a threshold value. It may also be determined that collateral ventilation is present if flow into the lung compartment remains above a threshold value. In an embodiment, a degree of collateral ventilation may be determined based on the measured flow into the lung compartment.

In another aspect, a method of assessing the functionality of a lung compartment in a patient comprises sealing a distal end of a catheter in an airway feeding the lung compartment by using an occluding member that is adapted to be expanded in an airway which feeds the lung compartment such that access to the lung compartment is provided only through a passage of the catheter when the occluding member is expanded, allowing air to enter the lung compartment through the passage in the catheter while the patient is inhaling, blocking air from being expelled from the lung compartment through the catheter passage while the patient is exhaling by using a one-way flow element adapted to be disposed within or in-line with the passage of the catheter so that flow in a proximal-to-distal direction is allowed and flow in a distal-to-proximal direction is inhibited or prevented, measuring pressure within the lung compartment and flow into the lung compartment, and determining whether collateral ventilation is present in the lung compartment based on the measured pressure within the lung compartment. In an embodiment, determining whether collateral ventilation is present in the isolated lung compartment comprises calculating a value of collateral resistance. A degree of collateral ventilation may be determined based on the calculated value of collateral resistance.

Further aspects and embodiments of the present invention are described in further detail below, in reference to the attached drawings.

BRIEF DESCRIPTION OF THE DRAWINGS

Present embodiments have other advantages and features which will be more readily apparent from the following detailed description and the appended claims, when taken in conjunction with the accompanying drawings, in which:

DETAILED DESCRIPTION OF THE INVENTION

Figure 1:
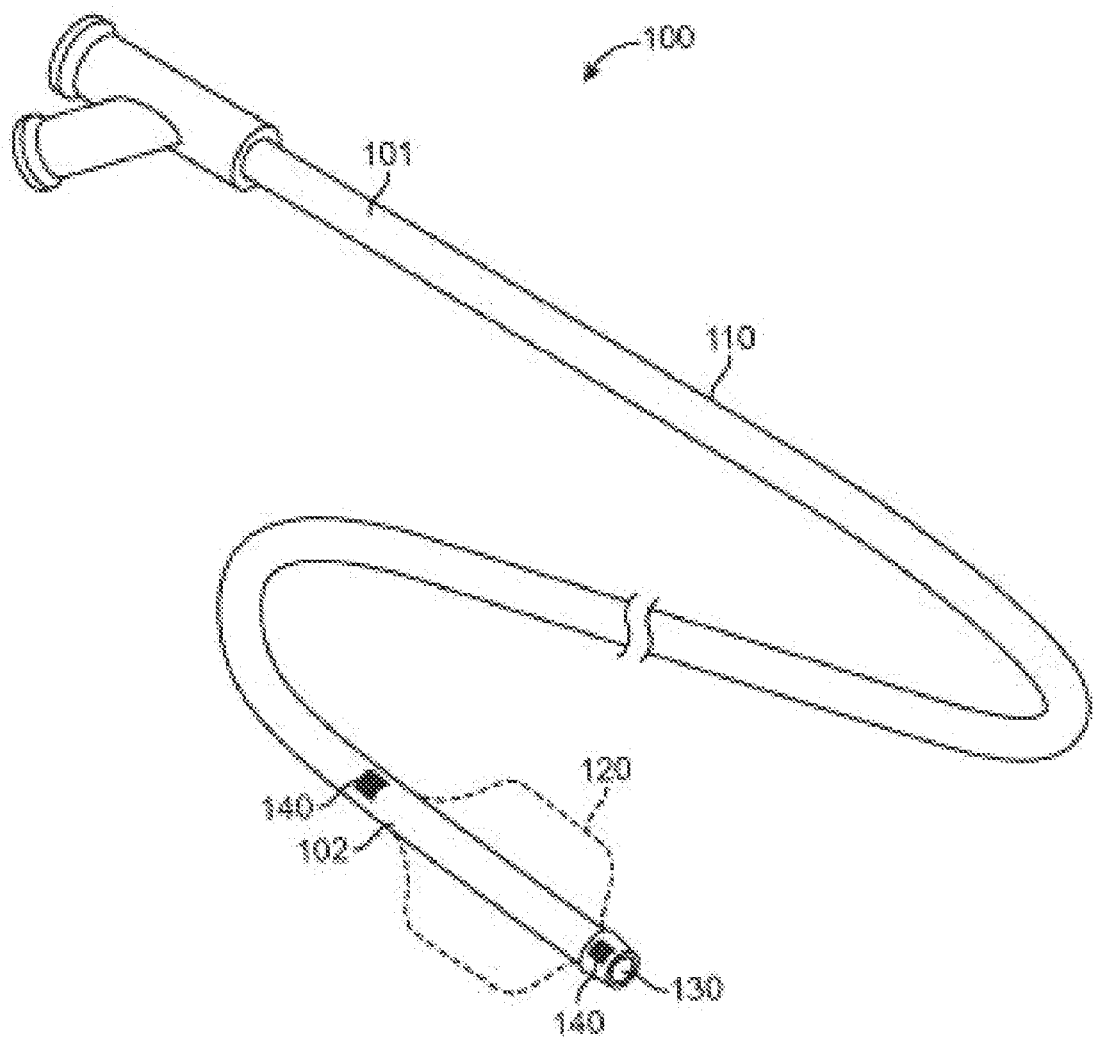
FIG. 1 shows a diagnostic or assessment catheter used in the disclosed methods according to some embodiments of the present invention.

Although the detailed description contains many specifics, these should not be construed as limiting the scope of the disclosure but merely as illustrating different examples and aspects of the disclosure. It should be appreciated that the scope of the disclosure includes other aspects and embodiments not discussed herein. Various other modifications, changes and variations which will be apparent to those skilled in the art may be made in the arrangement, operation and details of the method, device, and system of the aspects and embodiments disclosed herein without departing from the spirit and scope of the disclosure as described here.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The word "exemplary" is used herein to mean "serving as an example, instance, or illustration." Any implementation described herein as "exemplary" is not necessarily to be construed as advantageous over other implementations.

The present application provides methods and systems for targeting, accessing and diagnosing diseased lung compartments. Such compartments could be an entire lobe, a segment, a sub-segment or any such portion of the lung. Diagnosis is achieved in the disclosed embodiments by isolating a lung compartment to obtain various measurements to determine lung functionality. Though COPD is mentioned as an example, the applicability of these methods for treatment and diagnosis is not limited to COPD, but can be applicable to any lung disease.

The methods are minimally invasive in the sense that the required instruments are introduced through the mouth, a tracheostomy, or other site, typically via a bronchoscope, assisted ventilation device, or other non-surgical device passed through the mouth into the trachea and airways. In some embodiments, the patient is allowed to breathe normally during the procedures. Some embodiments may be used with assisted (or positive pressure) ventilation. The methods involve detecting the presence or characteristics (e.g., concentration or pressure) of one or more naturally occurring or introduced gases to determine the presence of collateral ventilation and/or to measure one or more other characteristics of a target lung compartment, such as oxygen saturation of tissue.

Figure 2:
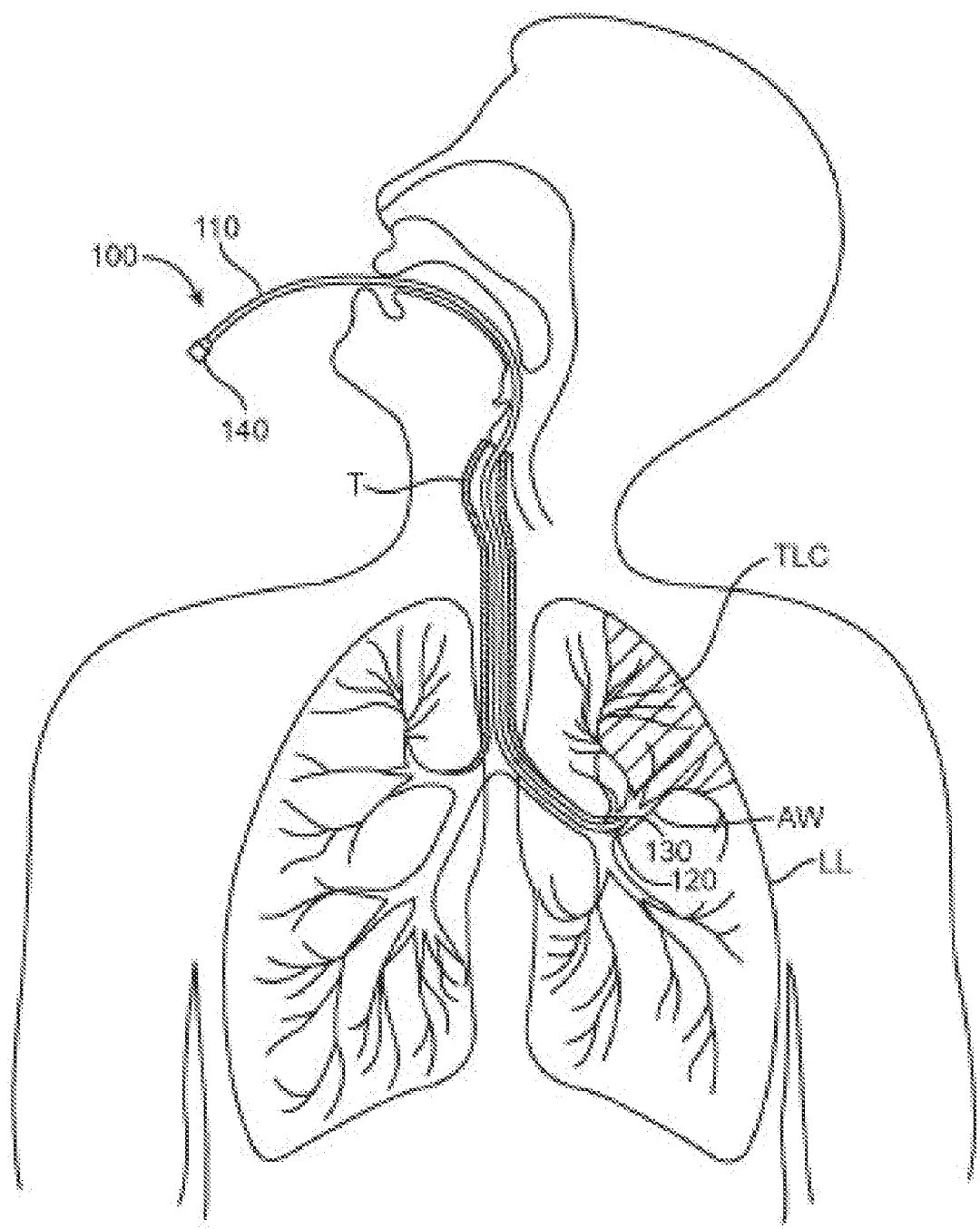
FIG. 2 shows the placement of the catheter shown in FIG. 1 in the lung.

In some of the present embodiments, isolation of the lung comprises sealingly engaging a distal end of a catheter in an airway feeding a lung compartment, as shown in FIGS. 1 and 2. Such a catheter has been disclosed in published U.S. patent application Ser. No. 10/241,733, which is incorporated herein by reference. As shown in FIG. 1, the catheter 100 comprises a catheter body 110, and an expandable occluding member 120 on the catheter body. The catheter body 110 has a distal end 102, a proximal end 101, and at least one lumen 130, extending from a location at or near the distal end to a location at or near the proximal end.

The proximal end of catheter 100 is configured to be coupled with an external control unit (or "console," not shown), and optionally comprises an inflation port (not shown). The distal end of catheter 100 is adapted to be advanced through a body passageway such as a lung airway. The expandable occluding member 120 is disposed near the distal end of the catheter body and is adapted to be expanded in the airway which feeds the target lung compartment. In one embodiment, the occluding member 120 is a compliant balloon made of transparent material. The transparent material allows visualization using the bronchoscope through the balloon. The occluding member 120 is inflatable via a syringe that is configured to be coupled to the inflation port. Optionally, catheter 100 comprises visual markers at the proximal and distal ends of the balloon to identify the location of the occluding member 120 within the airway prior to inflation. The occluding member 120 material inflates and seals with inflation pressures between 5-20 psi to prevent balloon migration within the airway. This inflation pressure also aids the occluding member 120 in maintaining a symmetrical configuration within the airway, thereby ensuring that the catheter (which is centered within the occluding member 120) will remain centered within the airway. The occluding member 120 material and attachment are also configured to minimize longitudinal movement of the occluding member 120 relative to the catheter body 110 itself. To accommodate the higher inflation pressure, the occluding member 120 is made of a polyurethane such as Pellethane 80A, but can be made of any material that is configured to maintain structural integrity at a high inflation pressure.

Additionally and optionally, catheter 100 further comprises at least one sensor 140 located within or in-line with the lumen 130 for sensing characteristics of various gases in air communicated to and from the lung compartment. The sensors may comprise any suitable sensors or any combination of suitable sensors, and are configured to communicate with control unit 200. Examples of sensors include pressure sensors, temperature sensors, air flow sensors, oxygen sensors, carbon dioxide sensors, gas-specific sensors, or other types of sensors. As shown in FIG. 1, the sensors 140 may be located near the distal end 102 of the catheter 100. Alternatively, the sensors 140 may be located at any one or more points along the catheter 100, or in-line with the catheter 100 and within the control unit with one or more measuring components.

In some embodiments the system comprises a one-way flow element located within or in-line with the lumen 130. Examples of one-way flow element are described in U.S. patent application Ser. No. 15/358,483, the full disclosure of which is hereby incorporated by reference. One-way flow elements may be configured to allow flow from an isolated lung compartment in a distal-to-proximal direction but inhibit or block flow back into the lung compartment in the proximal-to-distal direction. Alternatively, one-way flow elements may be configured such that flow in a proximal-to-distal direction is allowed and flow in a distal-to-proximal direction is inhibited or prevented.

As shown in FIG. 2, at least a distal portion of the catheter body 110 is adapted to be advanced into and through the trachea (T). The catheter may optionally be introduced through or over an introducing device such as a bronchoscope. The distal end 102 of the catheter body 110 can then be directed to a lung lobe (LL) to reach an airway (AW) which feeds a target lung compartment (TLC), which is to be assessed. When the occluding member 120 is expanded in the airway, the corresponding compartment is isolated with access to and from the compartment provided through the lumen 130.

Figure 3:
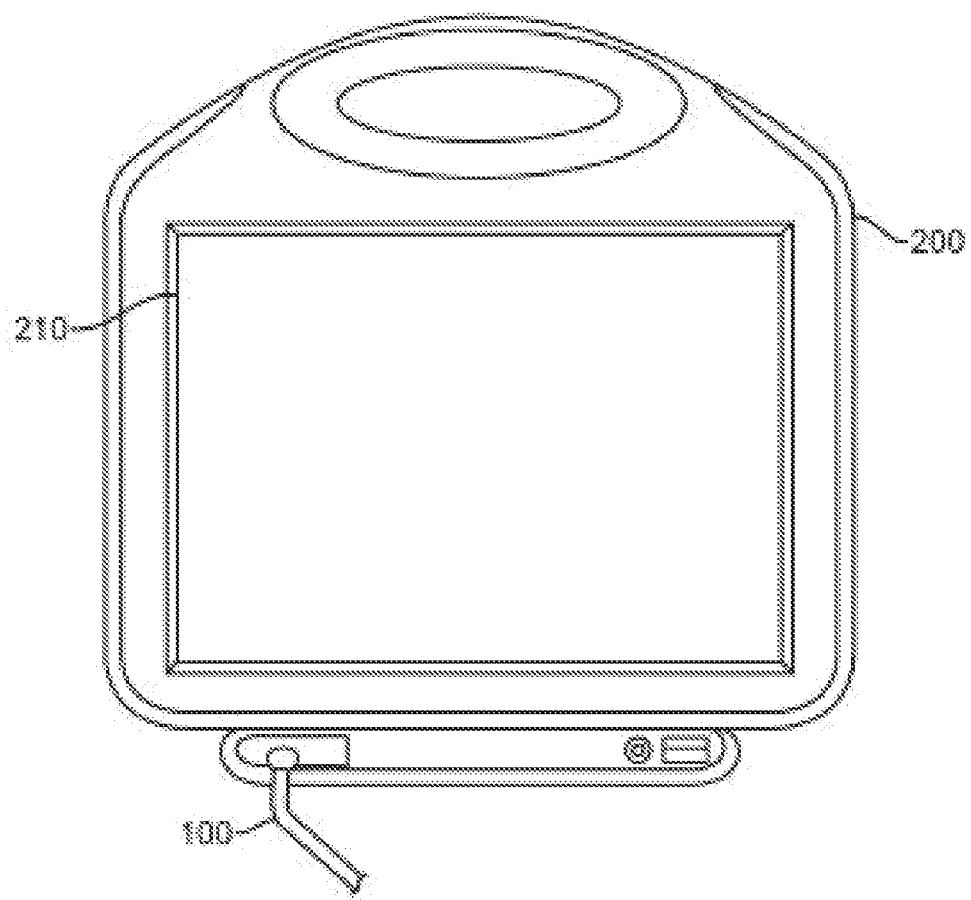
FIG. 3 shows a console configured to receive the catheter shown in FIG. 1.

The proximal end of the catheter 100 is configured to be coupled with a control unit (or "console") 200, as shown in FIG. 3. The control unit 200 comprises one or more measuring components (not shown) to measure lung functionality. The measuring components may take many forms and may perform a variety of functions. For example, the components may include a pulmonary mechanics unit, a physiological testing unit, a gas dilution unit, an imaging unit, a mapping unit, a treatment unit, a pulse oximetry unit or any other suitable unit. The components may be disposed within the control unit 200, or may be attached to the unit 200 from an external source. The control unit 200 comprises an interface for receiving input from a user and a display screen 210. The display-screen 210 will optionally be a touch-sensitive screen, and may display preset values. Optionally, the user will input information into the control unit 200 via a touch-sensitive screen mechanism. Additionally and optionally, the control unit 200 may be associated with external display devices such as printers or chart recorders. At least some of the above system embodiments will be utilized in the methods described below.

Figure 4A:
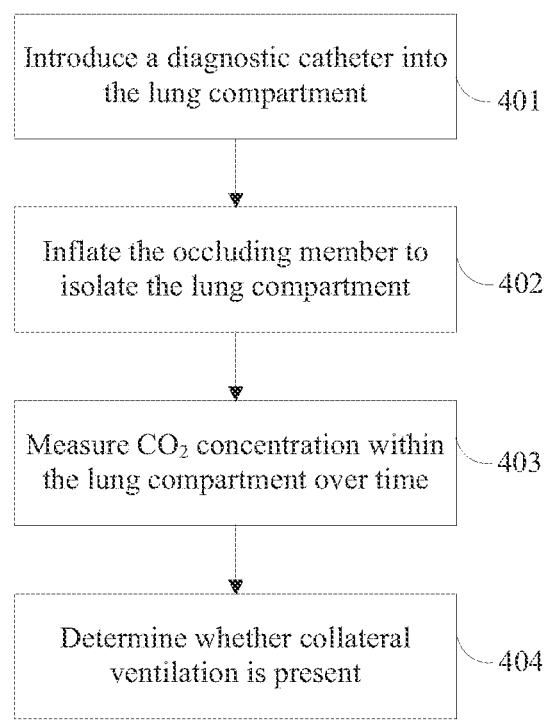
FIG. 4A is a flow diagram illustrating one embodiment of the present invention.
Figure 4B:
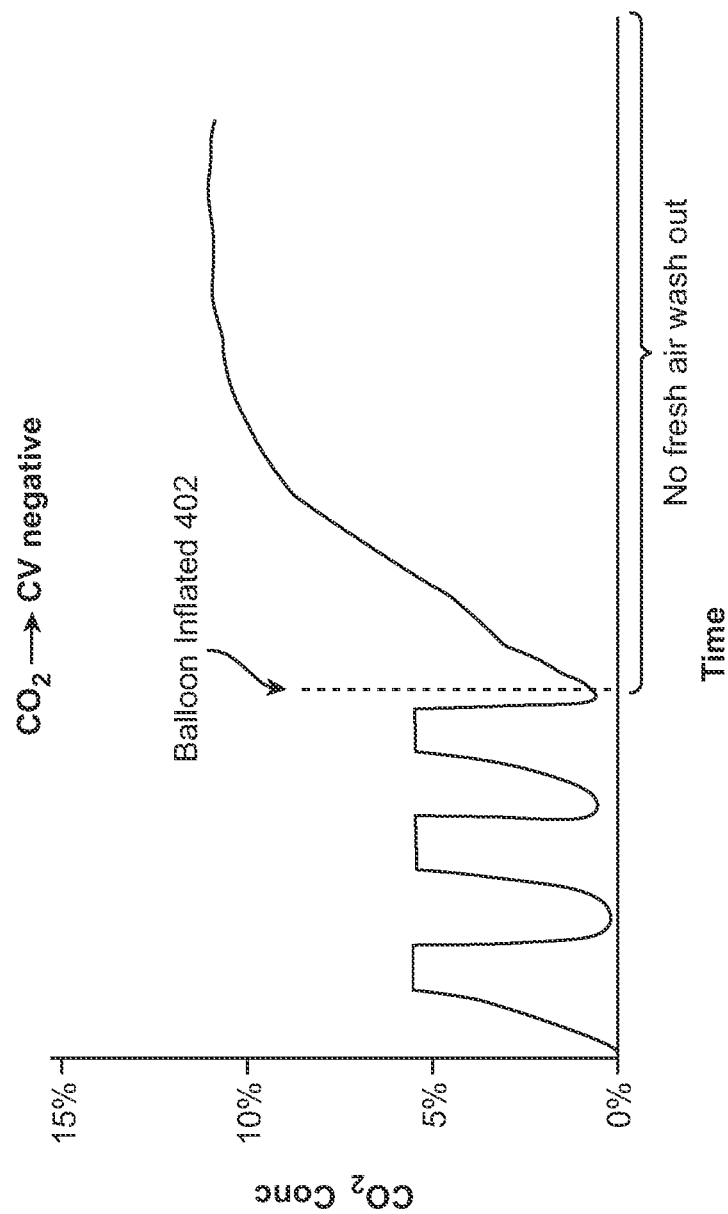
FIG. 4B shows $CO_2$ concentration where no collateral ventilation is present by using the method of FIG. 4A.
Figure 4C:
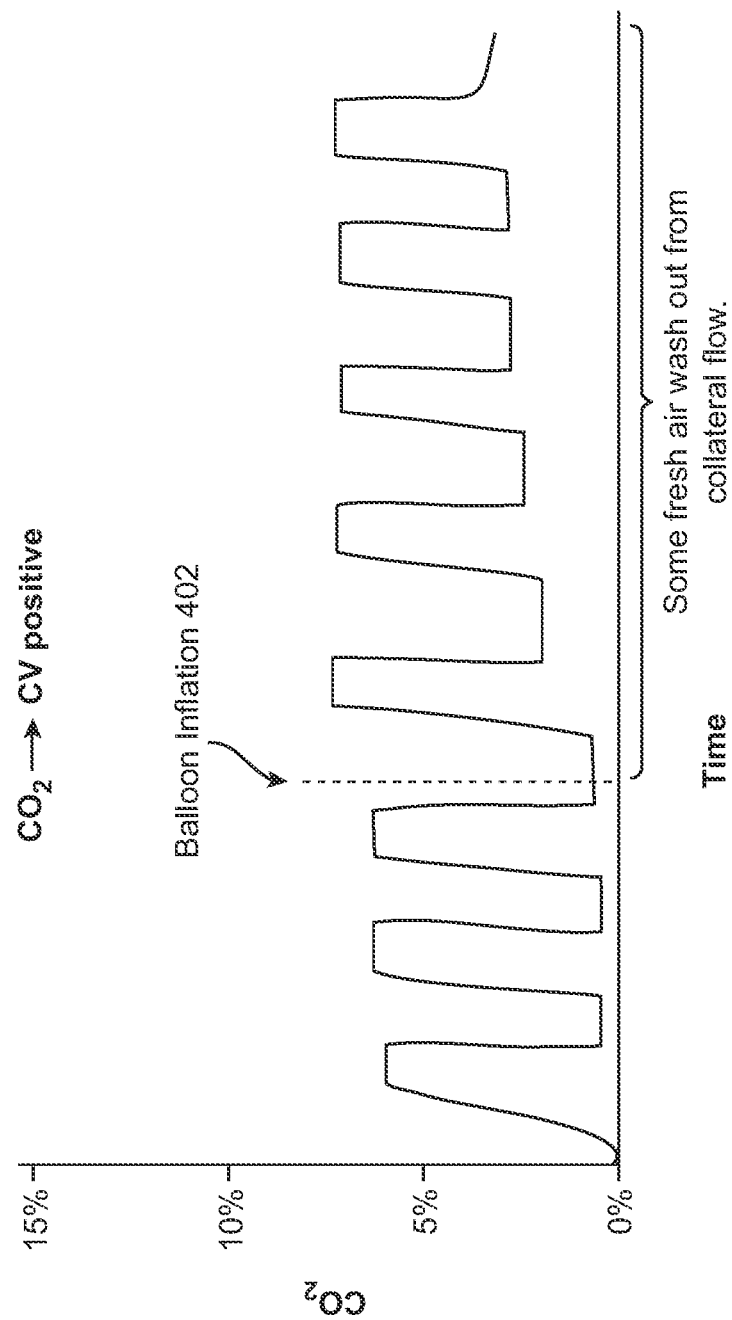
FIG. 4C shows $CO_2$ concentration where collateral ventilation is present by using the method of FIG. 4A.

FIG. 4A is a flow diagram illustrating one embodiment of assessing the functionality of a lung compartment in a patient by measuring $CO_2$ concentration in the lung compartment. FIG. 4B shows $CO_2$ concentration where no collateral ventilation is present by using the method of FIG. 4A. FIG. 4C shows $CO_2$ concentration where collateral ventilation is present by using the method of FIG. 4A. At step 401 a diagnostic catheter is introduce into the lung compartment. At step 402 an occluding member is inflated to isolate the lung compartment. At step 403 $CO_2$ concentration within the isolated lung compartment is measured over time. At step 404 the system determines whether collateral ventilation is present in the isolated lung compartment based on the measured $CO_2$ concentration within the isolated lung compartment over time. As can be seen in FIGS. 4B and 4C $CO_2$ concentration rises and falls with breathing before the occluding member is inflated in step 402. When collateral ventilation is not present, as shown in FIG. 4B, after the lung compartment is isolated in step 402, there is no fresh air wash out from collateral flow. The $CO_2$ concentration rises and plateaus over time. The system may be configured to detect a lack of collateral ventilation based on the plateau of $CO_2$ concentration within the isolated lung compartment over time. When collateral ventilation is present, as shown in FIG. 4C, after the lung compartment is isolated in step 402, there is some fresh air wash out from collateral flow. The $CO_2$ concentration continues to rise and fall with breathing. The system may be configured to detect the collateral ventilation based on the fluctuation of $CO_2$ concentration within the isolated lung compartment. In an embodiment, a degree of collateral ventilation may be determined based on the slopes of different regions of $CO_2$ concentration curves after the lung compartment has been isolated.

Figure 5A:
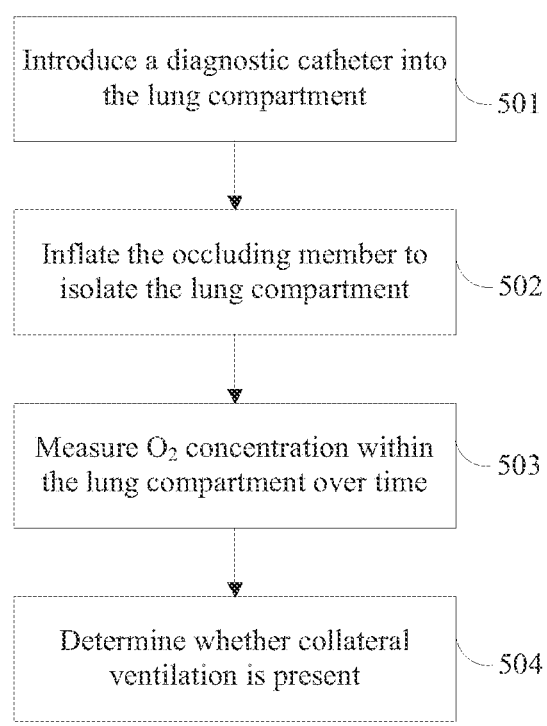
FIG. 5A is a flow diagram illustrating one embodiment of the present invention.
Figure 5B:
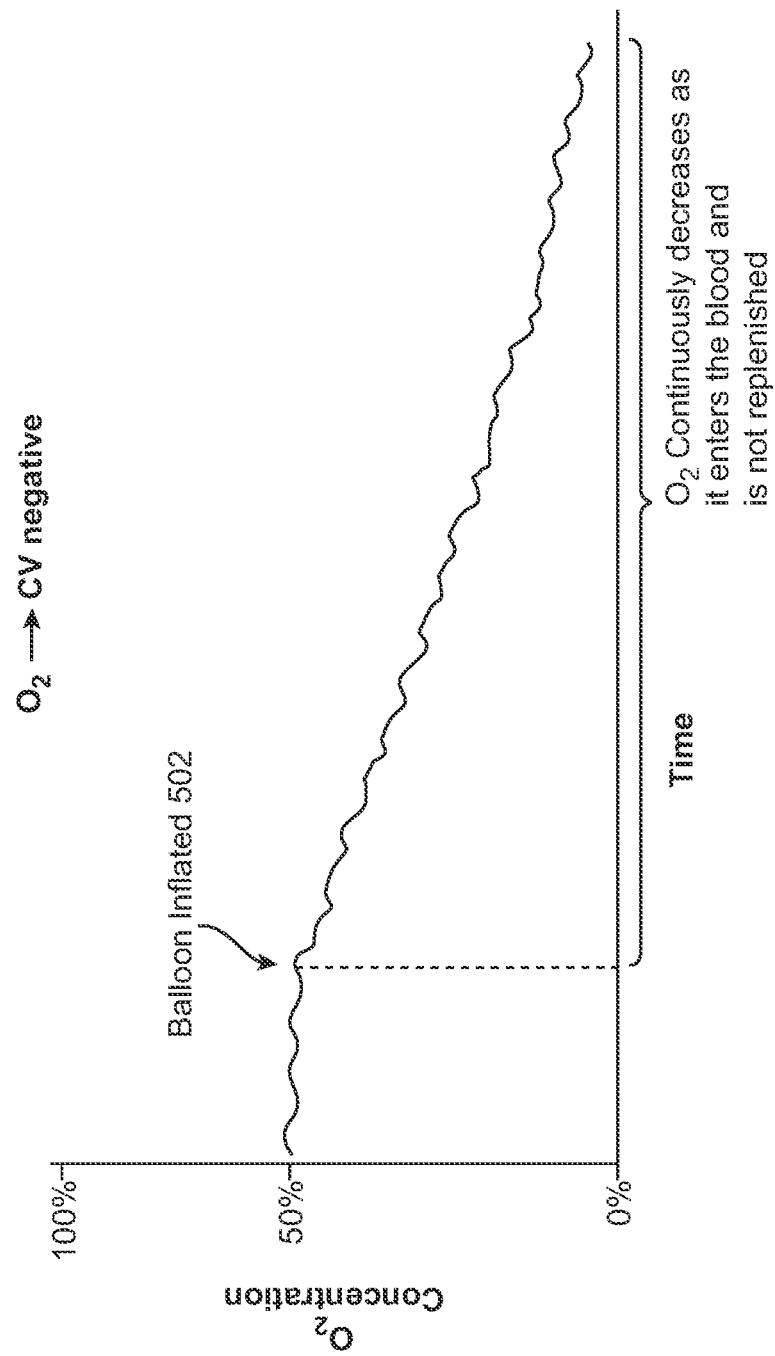
FIG. 5B shows $O_2$ concentration where no collateral ventilation is present by using the method of FIG. 5A.
Figure 5C:
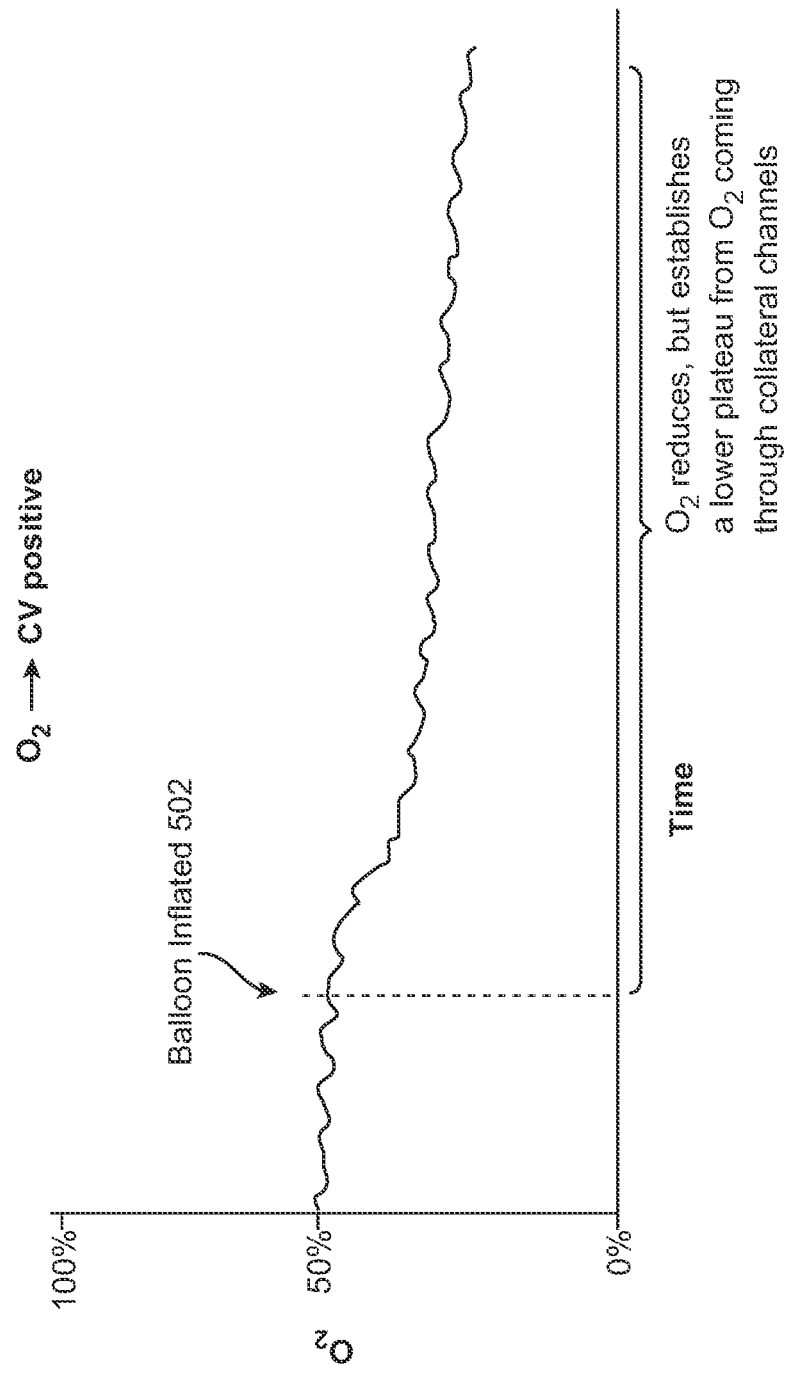
FIG. 5C shows $O_2$ concentration where collateral ventilation is present by using the method of FIG. 5A.

FIG. 5A is a flow diagram illustrating one embodiment of the present invention. FIG. 5B shows $O_2$ concentration where no collateral ventilation is present by using the method of FIG. 5A. FIG. 5C shows $O_2$ concentration where collateral ventilation is present by using the method of FIG. 5A. At step 501 a diagnostic catheter is introduce into the lung compartment. At step 502 an occluding member is inflated to isolate the lung compartment. At step 503 $O_2$ concentration within the isolated lung compartment is measured over time. At step 504 the system determines whether collateral ventilation is present in the isolated lung compartment based on the measured $O_2$ concentration within the isolated lung compartment over time. When collateral ventilation is not present, as shown in FIG. 5B, after the lung compartment is isolated in step 502, $O_2$ concentration continuously decreases as it enters the blood and is not replenished. $O_2$ concentration will drop to approximately the level of deoxygenated blood and remain low. The system may be configured to detect a lack of collateral ventilation if the $O_2$ concentration within the isolated lung compartment decreases below a threshold value. When collateral ventilation is present, as shown in FIG. 5C, after the lung compartment is isolated in step 502, $O_2$ concentration reduces but establishes a lower plateau because $O_2$ would enter from other compartments through collateral channels. Eventually $O_2$ would be fed by neighboring compartments as fast as it is being used by target compartments. The system may be configured to detect collateral ventilation if the $O_2$ concentration within the isolated lung compartment plateaus above a threshold value. In an embodiment, a degree of collateral ventilation may be determined based on the degree of reduction of the $O_2$ concentration within the isolated lung compartment after isolation. A higher value of the $O_2$ concentration at the plateau indicates a higher degree of collateral ventilation. In an embodiment, the methods may be performed while the patient is ventilated via an assisted ventilation device with air having an elevated $O_2$ concentration. Elevated $O_2$ concentrations may be any concentration above the 21% in normal air. Various embodiments may use elevated $O_2$ concentrations of approximately 50%, 60%, or 100%.

Figure 6:
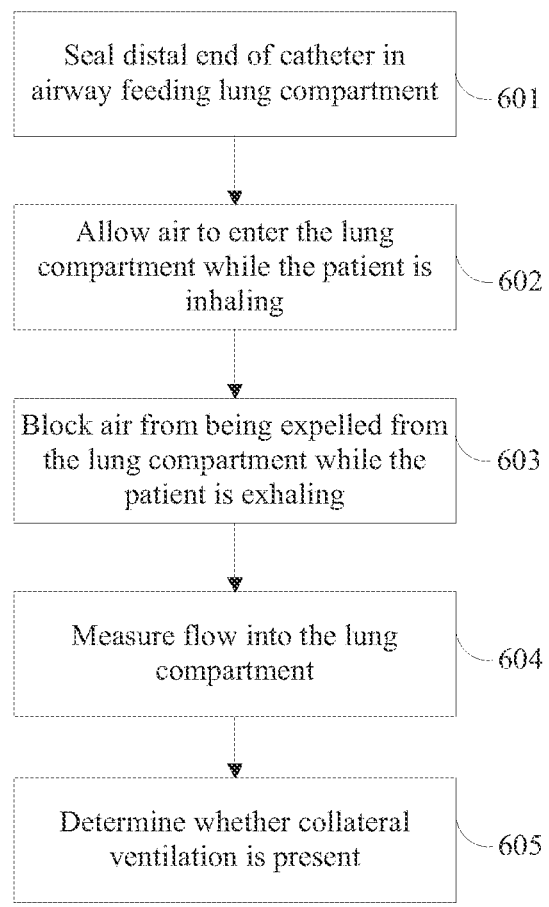
FIG. 6 is a flow diagram illustrating one embodiment of the present invention.

FIG. 6 is a flow diagram illustrating an embodiment of a method of assessing the functionality of a lung segment in a patient. At step 601 a distal end of a catheter in an airway feeding the lung compartment is sealed by using an occluding member that is adapted to be expanded in an airway which feeds the lung compartment such that access to the lung segment is provided only through a passage of the catheter when the occluding member is expanded. At step 602, air is allowed to enter the lung compartment through the passage in the catheter while the patient is inhaling. At step 603, air is blocked from being expelled from the lung compartment through the catheter passage while the patient is exhaling by using a one-way flow element adapted to be disposed within or in-line with the passage of the catheter so that flow in a proximal-to-distal direction is allowed and flow in a distal-to-proximal direction is inhibited or prevented. In an embodiment the one-way flow element is a solenoid valve configured to close during exhalation and open during inhalation. At step 604, flow into the lung compartment is measured. At step 605, the system determines whether collateral ventilation is present in the isolated lung compartment based on the measured flow into the lung compartment. The system may be configured to determine that no collateral ventilation is present if flow into the lung compartment decreases below a threshold value. The system may also be configured to determine that collateral ventilation is present if flow into the lung compartment remains above a threshold value. In an embodiment, a degree of collateral ventilation may be determined based on the measured flow into the lung compartment. A baseline flow may be determined before the one-way flow element is actuated. A degree of collateral ventilation may be determined based on the difference between the baseline flow and the flow after the one-way flow element is actuated. A low difference in flow indicates that there is a high degree of collateral ventilation. A large difference in flow indicates very little collateral ventilation. Methods may be performed during unassisted breathing or with assisted ventilation.

Figure 7:
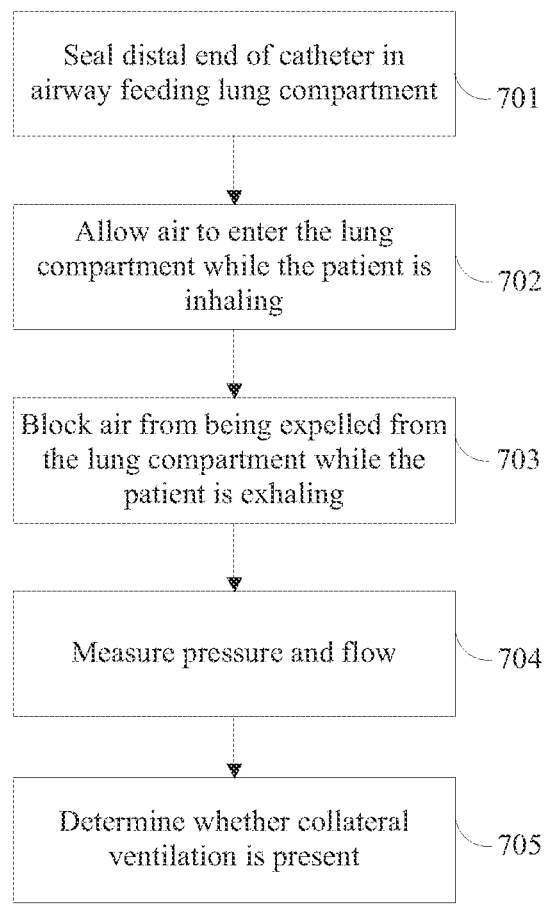
FIG. 7 is a flow diagram illustrating an embodiment of the present invention.

FIG. 7 is a flow diagram illustrating an embodiment of a method of assessing the functionality of a lung segment in a patient. At step 701 a distal end of a catheter in an airway feeding the lung compartment is sealed by using an occluding member that is adapted to be expanded in an airway which feeds the lung compartment such that access to the lung segment is provided only through a passage of the catheter when the occluding member is expanded. At step 702, air is allowed to enter the lung compartment through the passage in the catheter while the patient is inhaling. At step 703, air is blocked from being expelled from the lung compartment through the catheter passage while the patient is exhaling by using a one-way flow element adapted to be disposed within or in-line with the passage of the catheter so that flow in a proximal-to-distal direction is allowed and flow in a distal-to-proximal direction is inhibited or prevented. In an embodiment the one-way flow element is a solenoid valve configured to close during exhalation and open during inhalation. At step 704, pressure within the lung compartment and flow into the lung compartment are measured. At step 705, the system determines whether collateral ventilation is present in the isolated lung compartment based on the measured pressure and flow. In an embodiment, determining whether collateral ventilation is present in the isolated lung compartment comprises calculating a value of collateral resistance. A degree of collateral ventilation may be determined based on the calculated value of collateral resistance. Methods may be performed during unassisted breathing or with assisted ventilation.

Although certain embodiments of the disclosure have been described in detail, certain variations and modifications will be apparent to those skilled in the art, including embodiments that do not provide all the features and benefits described herein. It will be understood by those skilled in the art that the present disclosure extends beyond the specifically disclosed embodiments to other alternative or additional embodiments and/or uses and obvious modifications and equivalents thereof. In addition, while a number of variations have been shown and described in varying detail, other modifications, which are within the scope of the present disclosure, will be readily apparent to those of skill in the art based upon this disclosure. It is also contemplated that various combinations or subcombinations of the specific features and aspects of the embodiments may be made and still fall within the scope of the present disclosure. Accordingly, it should be understood that various features and aspects of the disclosed embodiments can be combined with or substituted for one another in order to form varying modes of the present disclosure. Thus, it is intended that the scope of the present disclosure herein disclosed should not be limited by the particular disclosed embodiments described above. For all of the embodiments described above, the steps of any methods need not be performed sequentially.

What is claimed is:

1. A method of assessing functionality of a lung compartment in a patient, the method comprising:
   sealing a distal end of a catheter in an airway feeding the lung compartment by using an occluding member that is adapted to be expanded in an airway which feeds the lung compartment such that access to the lung compartment is provided only through a passage of the catheter when the occluding member is expanded;
   allowing air to enter the lung compartment through the passage in the catheter while the patient is inhaling;
   blocking air from being expelled from the lung compartment through the passage in the catheter while the patient is exhaling by using a solenoid valve adapted to be disposed within or in-line with the passage of the catheter so that flow in a proximal-to-distal direction is allowed and flow in a distal-to-proximal direction is inhibited or prevented, wherein a control unit is coupled to the solenoid valve and configured to close the solenoid valve during exhalation and open the solenoid valve during inhalation;
   measuring a baseline flow into the lung compartment via one or more flow sensors communicatively coupled to the control unit while the patient is inhaling before actuation of the solenoid valve;
   measuring flow into the lung compartment via the one or more flow sensors communicatively coupled to the control unit while the patient is inhaling after actuating of the solenoid valve; and
   determining a degree of collateral ventilation present in the lung compartment based at least in part on a difference between the baseline flow and the measured flow into the lung compartment while the patient is inhaling without ventilation assistance, wherein the degree of collateral ventilation present is correlated to the difference between the baseline flow and the measured flow.

2. The method of claim 1, wherein determining whether collateral ventilation is present in the lung compartment comprises determining that no collateral ventilation is present if flow into the lung compartment decreases below a threshold value.

3. The method of claim 1, wherein determining whether collateral ventilation is present in the lung compartment comprises determining that collateral ventilation is present if flow into the lung compartment remains above a threshold value.

4. The method of claim 1, wherein the distal end of the catheter is sealed in the airway by inflating the occluding member with a pressure between 5 and 20 psi.

5. The method of claim 1, further comprising measuring pressure within the lung compartment.

6. The method of claim 5, wherein determining whether collateral ventilation is present in the lung compartment is further based on the measured pressure.

7. The method of claim 6, wherein determining whether collateral ventilation is present in the lung compartment comprises calculating a value of collateral resistance.

8. The method of claim 7, further comprising determining a degree of collateral ventilation based on the calculated value of collateral resistance.

9. Apparatus for assessing functionality of a lung compartment in a patient, the apparatus comprising:
   a catheter having a distal end and a passage;
   an occluding member for sealing the distal end of the catheter in an airway feeding the lung compartment, the occluding member being adapted to be expanded in an airway which feeds the lung compartment such that access to the lung compartment is provided only through the passage of the catheter when the occluding member is expanded;
   a control unit coupled to a solenoid valve;
   the solenoid valve adapted to be disposed within or in-line with the passage of the catheter so that flow in a proximal-to-distal direction is allowed and flow in a distal-to-proximal direction is inhibited or prevented, the control unit configured to close the solenoid valve during exhalation and open the solenoid valve during inhalation thereby allowing air to enter the lung compartment through the passage in the catheter while the patient is inhaling and blocking air from being expelled from the lung compartment through the passage in the catheter while the patient is exhaling;
   one or more flow sensors communicatively coupled to the control unit for measuring a baseline flow into the lung compartment while the patient is inhaling before actuation of the solenoid valve and measuring flow into the lung compartment while the patient is inhaling after actuation of the solenoid valve; and
   determining means for determining a degree of collateral ventilation present in the lung compartment based at least in part on a difference between the baseline flow and the measured flow into the lung compartment while the patient is inhaling without ventilation assistance, wherein the degree of collateral ventilation present is correlated to the difference between the baseline flow and the measured flow.

10. The apparatus of claim 9, wherein the determining means is configured to determine that no collateral ventilation is present if flow into the lung compartment decreases below a threshold value.

11. The apparatus of claim 9, wherein the determining means is configured to determine that collateral ventilation is present if flow into the lung compartment remains above a threshold value.

12. The apparatus of claim 9, wherein the distal end of the catheter is sealed in the airway by inflating the occluding member with a pressure between 5 and 20 psi.

13. The apparatus of claim 9, wherein the one or more flow sensors are further configured to measure pressure within the lung compartment, and wherein the determining means is further configured to determine whether collateral ventilation is present in the lung compartment based on the measured pressure.

14. The apparatus of claim 13, wherein the determining means is configured to determine whether collateral ventilation is present in the lung compartment by calculating a value of collateral resistance.

15. The apparatus of claim 14, wherein the determining means is further configured to determine a degree of collateral ventilation based on the calculated value of collateral resistance.

16. The method of claim 1, wherein the degree of collateral ventilation present is inversely correlated to the difference between the baseline flow and the measured flow.

17. The apparatus of claim 9, wherein the degree of collateral ventilation present is inversely correlated to the difference between the baseline flow and the measured flow.

* * * * *